US007097119B2

(12) United States Patent
Hornsby et al.

(10) Patent No.: US 7,097,119 B2
(45) Date of Patent: Aug. 29, 2006

(54) POWER SPRAYER

(75) Inventors: James Russell Hornsby, St. Louis, MO (US); Marcellus Rambo Benson, Chesterfield, MO (US); James Augustus Keefe, III, O'Fallon, MO (US); Joseph Lee McGowan, St. Charles, MO (US)

(73) Assignee: Cepia, LLC, St. Louis, MO (US)

( * ) Notice: Subject to any disclaimer, the term of this patent is extended or adjusted under 35 U.S.C. 154(b) by 96 days.

(21) Appl. No.: 10/832,682

(22) Filed: Apr. 27, 2004

(65) Prior Publication Data

US 2005/0133626 A1 Jun. 23, 2005

Related U.S. Application Data

(60) Provisional application No. 60/530,869, filed on Dec. 18, 2003.

(51) Int. Cl.

| | |
|---|---|
| ***B05B 1/32*** | (2006.01) |
| ***B05B 9/04*** | (2006.01) |
| ***A62C 13/62*** | (2006.01) |
| ***A01G 25/14*** | (2006.01) |
| *B65C 88/54* | (2006.01) |

(52) U.S. Cl. ...................... 239/451; 239/347; 239/302; 239/332; 239/488; 239/375; 239/378; 239/360; 222/333; 222/481.5; 222/481

(58) Field of Classification Search ................ 239/329, 239/331, 332, 333, 337, 347–49, 363, 463–4, 239/469–71, 526–28; 222/382–83, 372, 222/380

See application file for complete search history.

(56) References Cited

U.S. PATENT DOCUMENTS

| | | | | |
|---|---|---|---|---|
| 2,117,747 | A | | 5/1938 | Smith et al. |
| 2,704,690 | A | | 3/1955 | Eichenauer |
| 3,137,326 | A | | 6/1964 | Welty et al. |
| 3,445,068 | A | | 5/1969 | Wagner |
| 3,490,656 | A | * | 1/1970 | Taschner .................... 222/394 |
| 3,667,655 | A | | 6/1972 | Knierien, Jr. |
| 3,904,116 | A | | 9/1975 | Jones et al. |
| 3,967,765 | A | | 7/1976 | Micallef |
| 3,993,250 | A | | 11/1976 | Shure |
| 4,020,979 | A | | 5/1977 | Shay et al. |
| 4,153,203 | A | | 5/1979 | Tada |

(Continued)

OTHER PUBLICATIONS http://www.solousa.com, 3 pages, Nov. 2004, "Chemical Applicators: Backpack Sprayers".

(Continued)

*Primary Examiner*—David A. Scherbel
*Assistant Examiner*—James S. Hogan
(74) *Attorney, Agent, or Firm*—Dorsey & Whitney, LLP

(57) ABSTRACT

The present invention is a dispenser adapted to couple to a fluid container having an opening surrounded by a neck. The dispenser comprises a cap, a dispensing head, an energy source, and a conduit. The cap is adapted to seal the opening fluid tight when the dispenser is coupled to the container. The dispensing head is pivotably secured to the cap and includes a fluid pump, a motor adapted to power the pump, a trigger adapted to actuate the motor, and a nozzle orifice in fluid communication with a discharge end of the pump. The energy source is electrically connected to the motor and extends inside the container. The conduit has a first end in fluid communication with an intake end of the pump and a second end inside the container.

25 Claims, 9 Drawing Sheets

U.S. PATENT DOCUMENTS

| | | | | |
|---|---|---|---|---|
| 4,154,375 | A | | 5/1979 | Bippus |
| 4,162,037 | A | | 7/1979 | Koyama |
| 4,182,496 | A | | 1/1980 | Burke |
| 4,187,959 | A | | 2/1980 | Pelton |
| 4,189,098 | A | | 2/1980 | Wagner et al. |
| 4,204,614 | A | | 5/1980 | Reeve |
| 4,234,128 | A | | 11/1980 | Quinn et al. |
| 4,239,129 | A | | 12/1980 | Esposito |
| 4,260,079 | A | | 4/1981 | Cary et al. |
| 4,273,290 | A | | 6/1981 | Quinn |
| 4,393,993 | A | | 7/1983 | Kille et al. |
| 4,516,695 | A | | 5/1985 | Garneau |
| 4,618,099 | A | | 10/1986 | Nagao et al. |
| 4,621,770 | A | | 11/1986 | Sayen |
| 4,706,888 | A | | 11/1987 | Dobbs |
| 4,767,033 | A | | 8/1988 | Gemperle |
| 4,830,235 | A | * | 5/1989 | Miller ..................... 222/464.4 |
| 4,881,687 | A | | 11/1989 | Ballu |
| 4,925,105 | A | | 5/1990 | Lin |
| 5,014,884 | A | | 5/1991 | Wunsch |
| 5,078,188 | A | | 1/1992 | Nitzberg et al. |
| 5,147,074 | A | | 9/1992 | Battegazzore |
| 5,147,292 | A | | 9/1992 | Kullas et al. |
| 5,150,841 | A | * | 9/1992 | Silvenis et al. ............. 239/332 |
| 5,154,317 | A | | 10/1992 | Roppolo, III |
| 5,156,304 | A | | 10/1992 | Battegazzore |
| 5,184,756 | A | * | 2/1993 | Amron ........................ 222/79 |
| 5,195,664 | A | * | 3/1993 | Rhea ....................... 222/464.4 |
| 5,215,227 | A | | 6/1993 | Farner |
| 5,360,153 | A | | 11/1994 | Cooper |
| 5,364,111 | A | | 11/1994 | Wunsch |
| 5,397,034 | A | * | 3/1995 | Wunsch ...................... 222/333 |
| 5,427,274 | A | | 6/1995 | Wood |
| 5,499,766 | A | | 3/1996 | Foster et al. |
| 5,549,249 | A | | 8/1996 | Foster et al. |
| 5,590,837 | A | | 1/1997 | Grogan |
| 5,605,496 | A | | 2/1997 | Pickard |
| 5,716,007 | A | | 2/1998 | Nottingham et al. |
| 5,769,325 | A | | 6/1998 | Jouillat et al. |
| D423,934 | S | | 5/2000 | Brozell |
| D442,088 | S | | 5/2001 | Trepina et al. |
| 6,227,412 | B1 | | 5/2001 | Sweeton |
| 6,260,722 | B1 | | 7/2001 | Ekkert |
| D454,778 | S | | 3/2002 | Siebert et al. |
| D454,779 | S | | 3/2002 | Siebert et al. |
| 6,478,196 | B1 | | 11/2002 | Fuchs |
| 6,502,766 | B1 | | 1/2003 | Streutker et al. |
| 6,554,211 | B1 | * | 4/2003 | Prueter et al. .............. 239/332 |
| 6,595,437 | B1 | | 7/2003 | Lawson et al. |
| 6,752,330 | B1 | * | 6/2004 | DiMaggio et al. .......... 239/337 |
| D494,866 | S | | 8/2004 | Guala |
| D495,399 | S | | 8/2004 | Guala |
| 6,945,438 | B1 | | 9/2005 | Shih et al. |
| 2003/0052194 | A1 | | 3/2003 | Streutker et al. |
| 2005/0082389 | A1 | | 4/2005 | Sanchez et al. |
| 2005/0098577 | A1 | | 5/2005 | Huy et al. |
| 2005/0133624 | A1 | | 6/2005 | Hornsby |
| 2005/0189381 | A1 | | 9/2005 | Tsuchida |
| 2005/0194467 | A1 | | 9/2005 | Wanbaugh et al. |

OTHER PUBLICATIONS http://www.solousa.com, 1 pages, Nov. 2004, "Chemical Applicators: Handheld Sprayers".

Saint-Gobain Calmar Inc., Copyright 2004, "PS2003 Ready to Use Power Sprayer", 2 pages.

http://www.solousa.com, 3 pages, Nov. 2004, "Chemical Applicators: Backpack Sprayers".

http://www.solousa.com, 1 pages, Nov. 2004, "Chemical Applicators: Handheld Sprayers".

Saint-Gobain Calmar Inc., Copyright 2004, "PS2003 Ready to Use Power Sprayer", 2 pages.

* cited by examiner

POWER SPRAYER

CROSS-REFERENCE TO RELATED APPLICATION

This application claims priority to U.S. provisional patent application 60/530,869, filed Dec. 18, 2003, which is hereby incorporated by reference in its entirety.

BACKGROUND

The present invention relates to devices and methods for dispensing substances. More particularly, the present invention relates to devices and methods for dispensing fluids and to a powered dispenser for attachment to a reservoir containing a fluid to be dispensed.

Hand operated sprayers are often mounted on containers of household liquids such as window and bathroom cleaners or ARMOR ALL®. A household liquid is dispensed from the hand-operated sprayer by repeatedly squeezing a lever on the sprayer. This can be tiresome. Consequently, powered sprayers have been previously developed to replace the hand-operated sprayers.

These previous powered sprayers suffer from several drawbacks. First, they often cannot be mounted on an off-the-shelf container of household liquid, instead relying on a special reservoir that must be refilled by the user. This can be messy and/or inconvenient for a user.

Second, the previous powered sprayers have spray heads or housings that are substantially larger and heavier than the standard hand operated sprayers. As a result, the previous powered sprayers tend to be top heavy and unwieldy. They tend to be expensive in comparison to non-powered sprayers and, for at least these reasons, are not optimally marketable.

There is a need in the art for a powered sprayer that has a spray head or housing that is similar in size and configuration to a standard hand operated sprayer.

SUMMARY

The present invention, in one embodiment, is a sprayer comprising a motorized liquid spray head or spray pump assembly. It includes an operating mechanism adapted to provide the user a push button actuated, automatic power spray for any of a variety of generally liquid or fluid materials. Examples of material that can be dispensed or sprayed by the power sprayer of the present invention include cleaning substances such as glass cleaner and the like. The present invention may also be used to spray or mist items with water, and it can be used to dispense insecticides, fungicides or the like. It also may be used for a wide range of other products or substances, e.g., sunscreens, liquid cleaners, disinfectants, herbicides, virtually any substance which can be dispensed, applied or used in a spray, atomized, vapor, stream, aerosol, or mist form.

In one embodiment, the sprayer of the present invention comprises a housing or attachment designed to fit typical, common bottles or other containers for containing substances. An example of such a container is the type used to contain common window cleaner. The sprayer, particularly the nozzle, of the present invention may be adjustable from a fine mist to a strong generally coherent stream.

In one embodiment, the invention includes a pick up tube, disposed inside the container or bottle to which the sprayer is attached, that is weighted and sufficiently flexible to allow the power sprayer to work at any angle and upside down.

In one embodiment, the weight at the end of the pick-up tube may be a die cast or brass weight with a slot in the end. The slot keeps the intake associated with the weight from being blocked or shut off against the side of the bottle. In one embodiment, the pick up tube to which the weight is attached is a very flexible silicon or like material, although any material may be selected as long as it is sufficiently flexible. The length of the pick up tube should be selected so it doesn't get caught or tangled.

In one embodiment, the present invention comprises a battery operated liquid spray pump which may be used interchangeably on typical containers or bottles for a variety of substances. The spray pump of the present invention may be used for a variety of purposes. For example, in the home, cleaning solutions such as window cleaners may be sprayed or dispensed with it. In the garage, for automotive uses, various cleaning materials may be dispensed or applied using the sprayer of the present invention. In the garden, the present invention may be used for spraying or dispensing insecticides, herbicides or for misting plants. It may be used in a wide variety of applications or uses at home or on the job, anywhere hand-pumped sprayers are currently in use.

In one embodiment, the pump unit or sprayer of the invention has two batteries (as many batteries as suitable may be used) that are housed inside the container or bottle neck in a tube-like housing when the sprayer of the invention is attached to a bottle or container. In other embodiments, other suitable power sources (e.g., a capacitor, capacitors, etc.) may be used.

In one embodiment, the sprayer of the present invention comprises a trigger, for example, a push button type trigger, that turns on a motorized pumping system, bringing the liquid to the sprayer nozzle under pressure and producing an adjustable spray mist. The trigger permits on/off fingertip control. The user simply touches or depresses the button when the spray is desired; release the button and the spray stops. In one embodiment, a weighted in-bottle pick up tube allows for any angle spraying.

In one embodiment, the sprayer unit of the present invention is designed to fit any standard cleaner bottle, but it may also comprise an empty bottle that the user can fill and use to dispense substances.

In some embodiments, a small funnel may be provided. Other features of the present invention may include a nozzle which is adjustable from a fine mist to a strong, substantially coherent stream. The attachment feature of the spray head unit of the present invention should be adapted to fit a typical standard size bottle or container, and in some embodiments, it may be adapted to be adjusted to containers with openings of various sizes. In one embodiment, the attachment feature or connector is a threaded adapter piece. The electrical system associated with the present invention should be water resistant whereby components should not rust or corrode due to contact with water or chemicals, including cleaning agents or soap. In one embodiment, the present invention comprises a motorized piston pump and nozzle for attaching to a container whereby the contents of the container may be dispensed. In other embodiments, the present invention may comprise a gear pump or other suitable pumping mechanism.

In one embodiment, the present invention comprises a dispensing attachment for mounting on or to a container containing a substance to be dispensed wherein the dispenser comprises a power source, e.g., batteries, a motor, a operating mechanism, a pump, a nozzle, and a pick up tube.

In some embodiments, the present invention includes a safety lock, which can comprise any suitable method for an operator to conveniently and easily lock and unlock the trigger or operating button of the invention. In one embodiment, this may comprise a safety lockout lever or slide type button. In some embodiments, the invention may be made available with a child safety cap.

In one embodiment, the present invention comprises a motorized spray unit comprising a motor, a piston pump, a flex weighted liquid draw or pick up tube, a battery housing and an adjustable nozzle. Suitable liquid conduits may be used to connect the liquid conducting portions of the invention and to provide a flow path. In one embodiment, the present invention uses a simple trigger or push button actuation switch to replace the manual pump and pump trigger or operating mechanisms typically found on such sprayers, and allows the user to spray without excessive finger or hand pumping or flexion. In some embodiments, the switch may be an "on/off" switch having two states. In other embodiments, a variable speed switch arrangement may be used. Such an arrangement may incorporate microprocessor, rheostatic or other suitable control components.

An advantage of the spray head of the present invention is that the batteries, or other suitable power source, fit inside the neck of the bottle when the spray head is attached to a bottle, whereby convenience, comfort, handling and use of the invention are balanced and facilitated.

In one embodiment, the entire pump unit including its handle portion and the battery unit which extends inside the bottle, should be adapted to be pivotal around a screw-on cap as one piece. This facilitates installing the spray head on a bottle or other container.

In one embodiment, the nozzle is rotatable between selected dispensing configurations including spray and stream. The nozzle may be adapted to provide indications, graphically or otherwise, of these and/or other operable conditions. In some embodiments, the sprayer may be adapted, by incorporating suitable electronic components to provide sensing and indicating features, and/or electronic control features, e.g., adjustable, rheostatic output pressure control. For example, the sprayer could sense and display dispensing pressure, contents remaining, etc.

In one embodiment, the present invention comprises a powered, motorized spray pump head including a battery housing, batteries, a straw-like liquid draw or pick-up tube, a soft flexible tube, a pump, a motor and gear assembly, safety lockout tab, a primer chamber, a multiple position nozzle, a trigger contact switch, a trigger and a weighted pick-up tube. Note that the safety lock tab may be adapted to interrupt the power supply and/or physically permit or not permit positioning or depression of the trigger.

The components of the present invention are appropriately housed in or extend from a housing which may be formed of a number of connected pieces, or which may be formed as a single piece.

In one embodiment, the present invention comprises a housing for containing or mounting the operable components and features of the present invention. At the outlet end of the housing, the invention includes a cap of a nozzle which provides for adjustment of the spray. An internal washer and rubber washer are provided for sealing purposes, and an axial cover is provided to close the end. The invention provides a fluid pathway in the housing which includes a first one-way valve, a suitable connector tube and a second one-way valve. One end of the second one-way valve is coupled to a piston housing which contains a piston ring and rod for reciprocating motion. The piston ring and rod are operably coupled to a gear box containing a gear, in turn driven by a motor. These components are suitably housed in the cover or housing. The housing is adapted to carry a threaded, cap-like structure for connection to the neck of a bottle or other container. A battery tube or housing extends generally from the underside of the cover through the cap portion. This provides a water or liquid proof housing for a required number of batteries.

On the intake side, the present invention comprises an absorbent tube carrying at one end a plastic ring and tube connector. A push button trigger is associated with the housing, and a safety lock is operably coupled to the housing whereby it can affect the function of the trigger.

A suitable valve or flow control arrangement is provided for pressure equalization, using, for example, a suitable one way valve or valves.

In one embodiment, the present invention comprises a hand held spray gun and supply unit comprising a housing with a hand grip portion, a pump assembly mounted in the housing including a pump and a nozzle, the pump comprising a cylinder with an intake and a piston mounted in the cylinder to pump fluid from the intake through the nozzle. An electric motor is mounted in the housing, and batteries are within a special container associated with the housing. A switch on a face of the housing adjacent to the hand grip is provided for actuating or operating the motor and, therefore, the pump, and a tube depends from the housing into the container for supplying liquid from the container to the intake for discharge through the nozzle.

The present invention, in another embodiment, is a dispenser adapted to couple to a fluid container having an opening surrounded by a neck. The dispenser comprises a cap, a dispensing head, an energy source, and a conduit. The cap is adapted to seal the opening fluid tight when the dispenser is coupled to the container. The dispensing head is pivotably secured to the cap and includes a fluid pump, a motor adapted to power the pump, a trigger adapted to actuate the motor, and a nozzle orifice in fluid communication with a discharge end of the pump. The energy source is electrically connected to the motor and extends inside the container. The conduit has a first end in fluid communication with an intake end of the pump and a second end inside the container. In some embodiments, the energy source (e.g., batteries, capacitors, etc.) may be located adjacent to the caps without extending or only slightly extending into the container.

The present invention, in another embodiment, is a dispensing attachment for coupling to a container containing a substance to be dispensed. The dispensing attachment comprises a motor, an actuating mechanism adapted to actuate the motor, a pump driven by the motor and including an intake end and a discharge end, a housing enclosing the motor and pump, a nozzle in fluid communication with the discharge end of the pump, and a generally flexible pick-up tube. The generally flexible pick-up tube has a first end and a second end. The first end is in fluid is in fluid communication with the intake end of the pump. The second end is free and carrying a weight formed of a corrosion and rust resistant material.

The present invention, in another embodiment, is a sprayer for dispensing a fluid. The sprayer includes a fluid container and a motor operated pump. The motor operated pump includes a pump cylinder, a fluid pathway, and a venting arrangement. The fluid pathway operably connects the container, the pump and a discharge opening. The venting arrangement includes a first vent and a second vent associated with the pump cylinder. The first vent is adapted to allow air into the cylinder and the second vent is in fluid communication with the container, generally opposite to the first vent, and adapted to allow air and excess fluid into the container.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The present invention is a novel and advantageous handheld power sprayer that has a motorized means for pumping a fluid from a reservoir containing the fluid. As will be understood from this detailed description, the power sprayer of the present invention has a configuration that allows it to more closely resemble the size, appearance and feel of standard hand operated sprayers. Thus, the power sprayer of the present invention is easier to hold and less fatiguing to use as compared to prior power sprayers.

Figure 1:
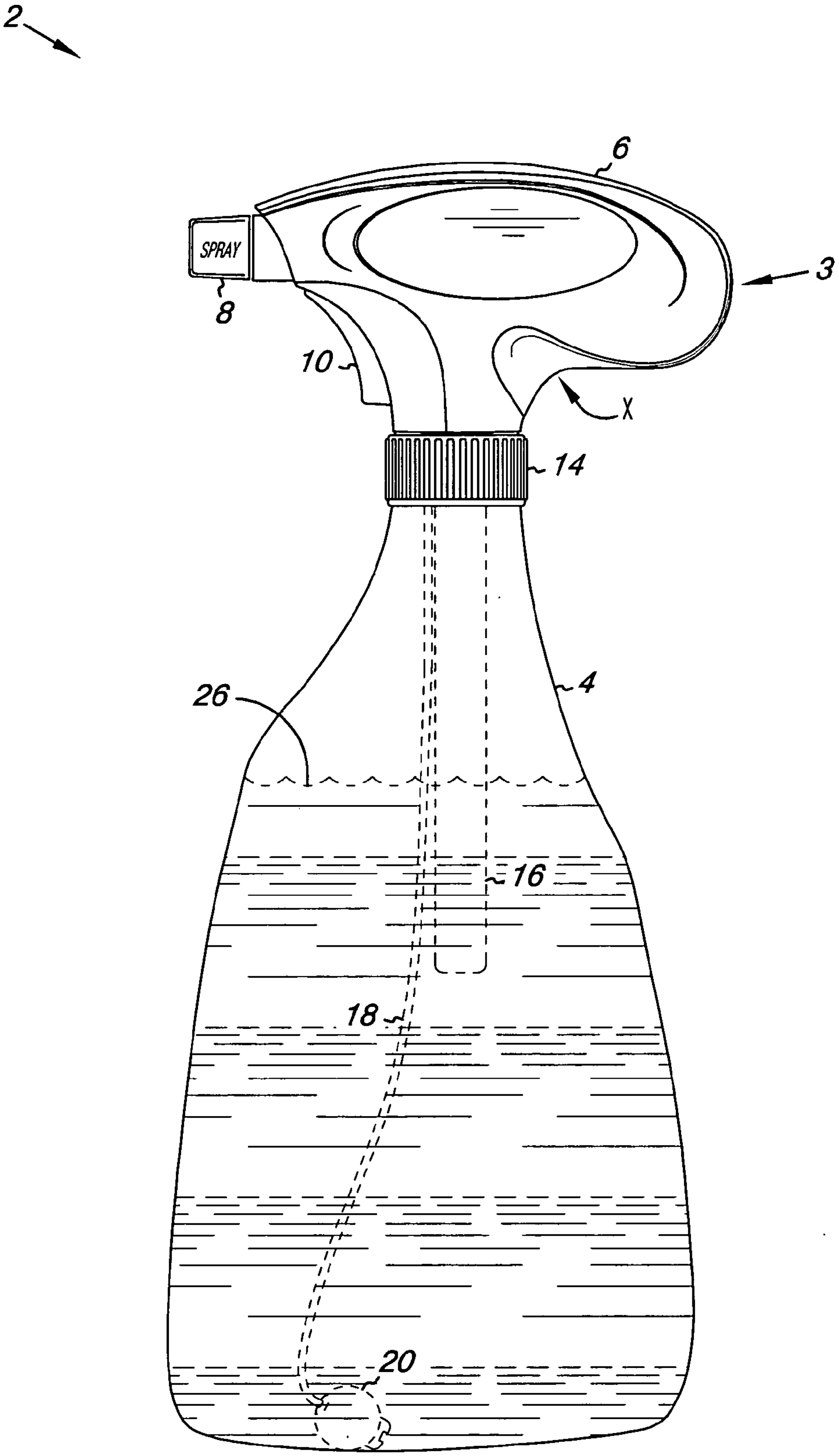
FIG. 1 is an elevation view of the non-safety lock side of the handheld power sprayer of the subject invention mounted on a reservoir adapted to contain a fluid.

FIG. 1 is an elevation view of the non-safety lock side of the handheld power sprayer 2 of the subject invention mounted on a reservoir 4 (i.e., a container of common household, garage or gardening liquid such as bathroom cleaner, window cleaner, ARMOR ALL®, fungicides, herbicides, pesticides, water, etc.). As shown in FIG. 1, the power sprayer 2 includes a spray head 3, a cap 14, a battery tube 16, and a flexible intake tube 18 with a weight 20. When the sprayer 2 is mounted on the reservoir 4, the spray head 3 and cap 14 are located outside the reservoir 4, while the battery tube 16, flexible intake tube 18, and weight 20 are located inside the reservoir 4.

Figure 2:
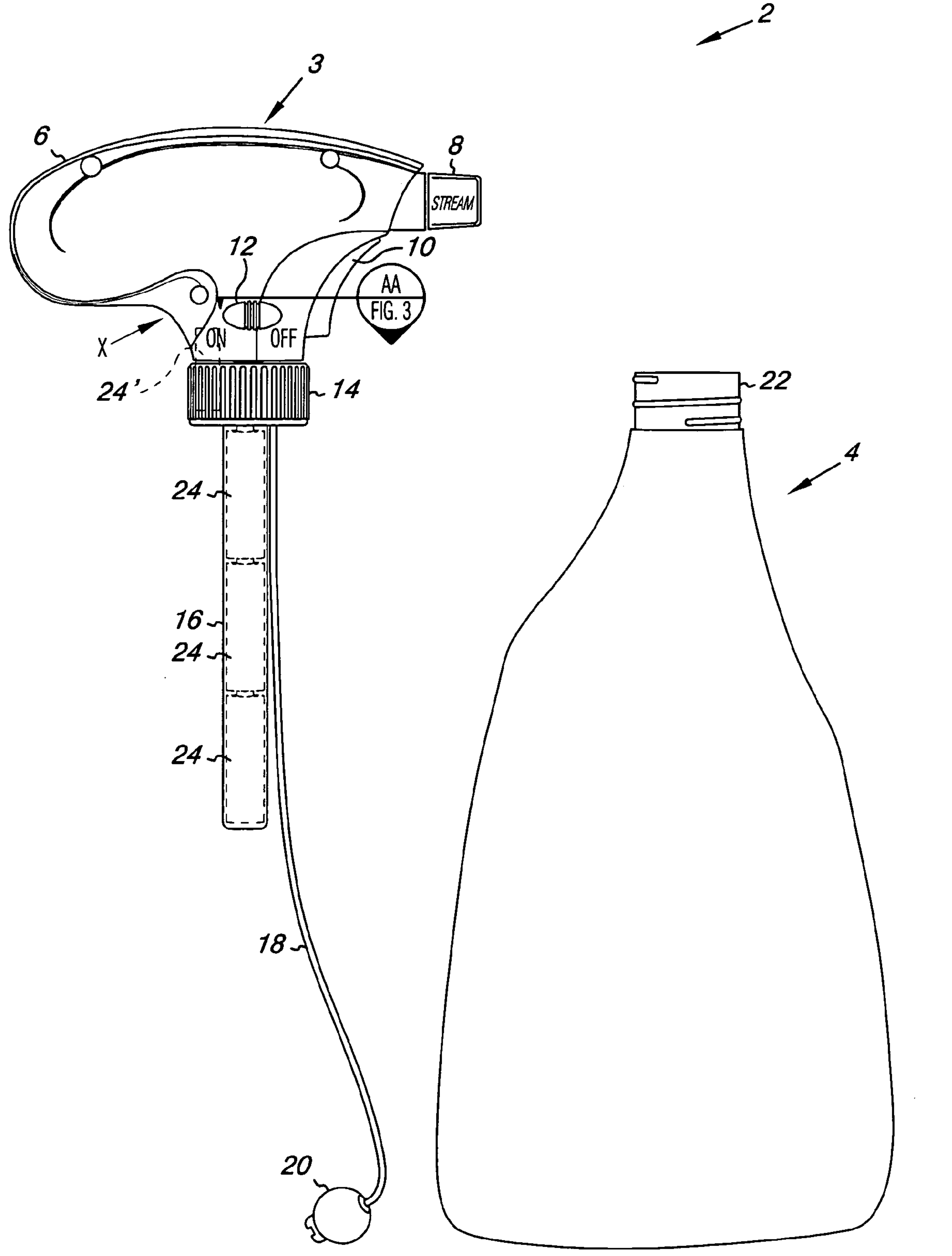
FIG. 2 is an elevation view of the safety lock side of the handheld power sprayer and the reservoir wherein the sprayer is not mounted on the reservoir.

FIG. 2 is an elevation view of the safety lock side of the handheld power sprayer 2 and the reservoir 4 wherein the sprayer 2 is not mounted on the reservoir 4. As shown in FIG. 2, the spray head 3 includes a housing 6, a nozzle cap 8, a trigger 10, and a safety lock 12.

As can be understood from FIGS. 1 and 2, the housing 6 is ergonomically contoured such that the portion of the hand between the thumb and forefinger abuts against contoured portion X while the forefinger is positioned to depress the trigger 10. The housing 6 contains the spraying mechanism of the sprayer 2.

As indicated in FIG. 2, the reservoir 4 has an opening surrounded by a neck 22 with male threads. As shown in FIG. 1, the cap 14 connects the sprayer 2 to the reservoir 4 via female threads adapted to mate with the male threads of the neck 22. The cap 14 is adapted to be compatible with most containers 4 used to hold common household, garage and garden liquids. However, in one embodiment, one or more adapters are provided with the sprayer 2 to facilitate the sprayer's connection to the necks 22 of most, if not all, containers 4.

In one embodiment, the spray head 3 is pivotably attached to the cap 14 such that the spray head 3 may freely pivot 360° about a vertical axis passing through the center point of the neck 22. This eases the attachment of the sprayer 2 to the neck 22 of the reservoir.

The trigger 10 is used to actuate the sprayer 2. As indicated in FIGS. 1 and 2, in one embodiment, the power sprayer 2 is actuated by partially displacing the trigger 10 into the housing 6.

Figure 3:
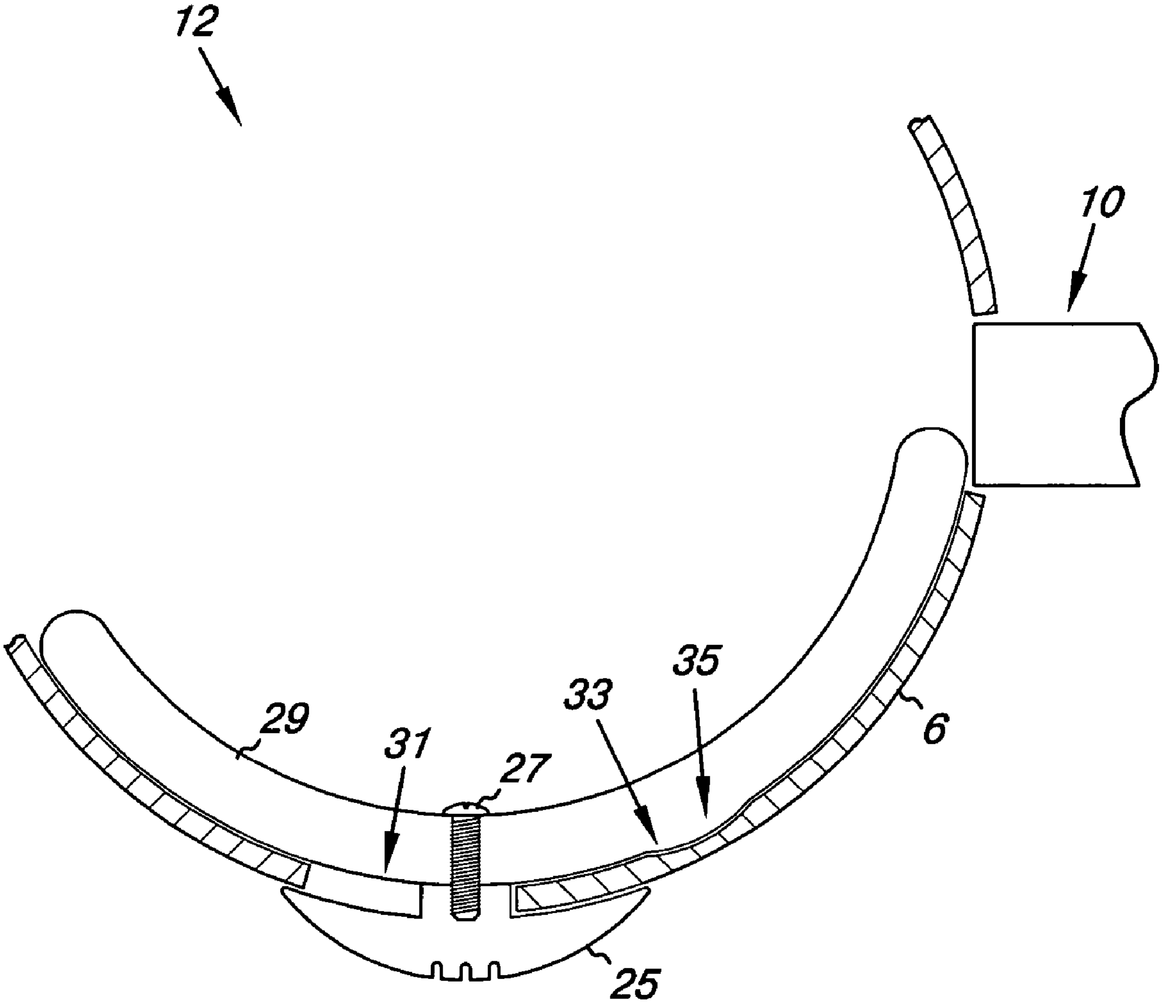
FIG. 3 is a plan view of the safety lock in the off position as taken along section line AA in FIG. 2

As illustrated in FIG. 2, in one embodiment, the safety lock 12 is horizontally displaceable along the housing 6 between a position marked "OFF" and a position marked "ON." As shown in FIG. 3, which is a plan view of the safety lock 12 in the off position as taken along section line AA in FIG. 2, when the safety lock 12 is slid into the off position, which is closer to the trigger 10 than the on position, the safety lock 12 prevents the trigger 10 from displacing into the housing 6. Thus, when the safety lock 12 is in the off position, the power sprayer 2 cannot be actuated via the trigger 12. Conversely, when the safety lock 12 is in the on position, the trigger 10 may be displaced into the housing 6 to actuate the power sprayer 2.

As illustrated in FIG. 3, the safety lock 12 includes a slide button 25 attached by a screw 27 to a block 29. The housing 6 is sandwiched between the button 25 and block 29 and has a slot 31 through which the button 25 extends to join the block 29. The slot 31 is sufficiently long to allow the safety lock 12 to slide into or out of engagement with the trigger 10. The block 29 has a bump 33 that mates with a depression 35 in the housing 6. The bump 33 and depression 35 serve to positively maintain the safety lock 12 in the off position and to provide a click sound to indicate engagement of the safety lock 12.

In other embodiments, the sprayer 2 may employ other safety measures for preventing unintentional discharge from the sprayer 2. These safety measures may include other mechanical means for locking and unlocking the trigger 10 of the sprayer 2, means for preventing the completion of the electrical circuit powering the sprayer 2, and/or a child-proof safety cap for placement on the nozzle cap 8.

As indicated in FIGS. 1 and 2, the nozzle cap 8 is pivotally attached to the housing 6 and allows a user to select between a spray or stream-type application of the fluid. In one embodiment, the nozzle cap 8 has four sides and each side could have a word or other indicia on it, such as "SPRAY" or "STREAM." In some embodiments other indicators, words or indicia, e.g., the word "OFF" could be used on one of the sides. To select a stream-type application (i.e., the liquid flow from the nozzle cap 8 is a strong, generally coherent stream), the nozzle cap 8 is pivoted until a side of the nozzle cap 8 with the word "STREAM" is facing upwards. Similarly, to select a spray-type application (i.e., the liquid flow from the nozzle cap 8 is a generally fine mist), the nozzle cap 8 is pivoted until a side of the nozzle cap 8 with the word "SPRAY" is facing upwards. In embodiments including an off setting, when the nozzle cap 8 is pivoted until a side of the nozzle cap 8 with the word "OFF" is facing upwards, the nozzle cap 8 will be shut off and no flow will be able to emit from the nozzle cap 8.

As shown in FIG. 1, when the sprayer 2 is mounted on a reservoir 4, the battery tube 16 extends from the cap 14 down into the reservoir 4. In one embodiment, as indicated in FIG. 2, the battery tube 16 contains three AAA batteries 24 that may be replaced when depleted. In other embodiments, the battery tube 16 may include a greater or lesser number of batteries 24. Also, the batteries 24 may be other sizes, such as AA. To allow the replacement of the batteries 24, the battery tube 16 is threadably removable from the sprayer 2.

In one embodiment, the disposable batteries 24 illustrated in FIGS. 1 and 2 are replaced with a rechargeable battery that is permanently installed in the battery tube 16. Once the energy is depleted from the rechargeable battery, the battery tube 16 is threadably removed from the sprayer 2 and inserted into a charger for recharging. In some embodiments, recharging may be accomplished inductively.

In one embodiment, where the sprayer 2 itself is meant to be disposable, the disposable batteries 24 illustrated in FIGS. 1 and 2 are replaced with a capacitor and coil system or a set of permanently installed non-rechargeable batteries. Thus, once the energy in the capacitor or non-rechargeable batteries is depleted, the entire sprayer 2 is thrown away. In some embodiments, the energy source may be located adjacent to the cap 14, as shown in phantom in FIG. 2, depicting a capacitor 24' near the cap 14.

Positioning the sprayer energy source (i.e., the batteries 24) within the reservoir 4 or adjacent to the cap 14 is advantageous for at least two reasons. First the sprayer 2 can have an energy source that is long lasting and powerful without resulting in an oversized and cumbersome housing 6. Second, positioning the batteries 24 within the reservoir lowers the sprayer's center of gravity. This makes a reservoir 4 equipped with the sprayer 2 less likely to tip over when set on a surface. Also, placing the weight of the batteries 24 below the gripping point of the sprayer 2 reduces the fatigue caused by using the sprayer 2, as compared to placing the weight of the batteries 24 above the gripping point (i.e., in the upper portions of the housing 6). Another advantage is that placing the batteries in a position in which the contents of the reservoir can contact them or their housing is that the contents help keep the batteries cool. Reduction of heat advantageously helps prolong battery life.

As shown in FIG. 1, the flexible intake tube 18 has a discharge end that is in fluid communication with the spraying mechanism contained in the housing 6 and an intake end that terminates within the weight 20 and is in fluid communication with the fluid 26 contained within the reservoir 4. The weight equipped flexible intake tube 18 is advantageous because it allows the sprayer 2 to operate regardless of the orientation of the sprayer 2 and its attached reservoir 4. For example, when the sprayer 2 is operated in an upright position as depicted in FIG. 1, the weight 20 causes the intake end of the flexible tube 18 to sink to the bottom of the fluid 26. Likewise, when the sprayer 2 is operated in an upside down position and the fluid 26 has accumulated near the neck 22 of the reservoir 4, the weight 20 causes the intake end of the flexible tube 18 to sink to the bottom of the fluid 26 (i.e., near the cap 14). Thus, regardless of the orientation of the reservoir 4, the weight 20 causes the intake end of the flexible tube 18 to be kept in fluid communication with the fluid 26 in the reservoir 4.

Figure 4:
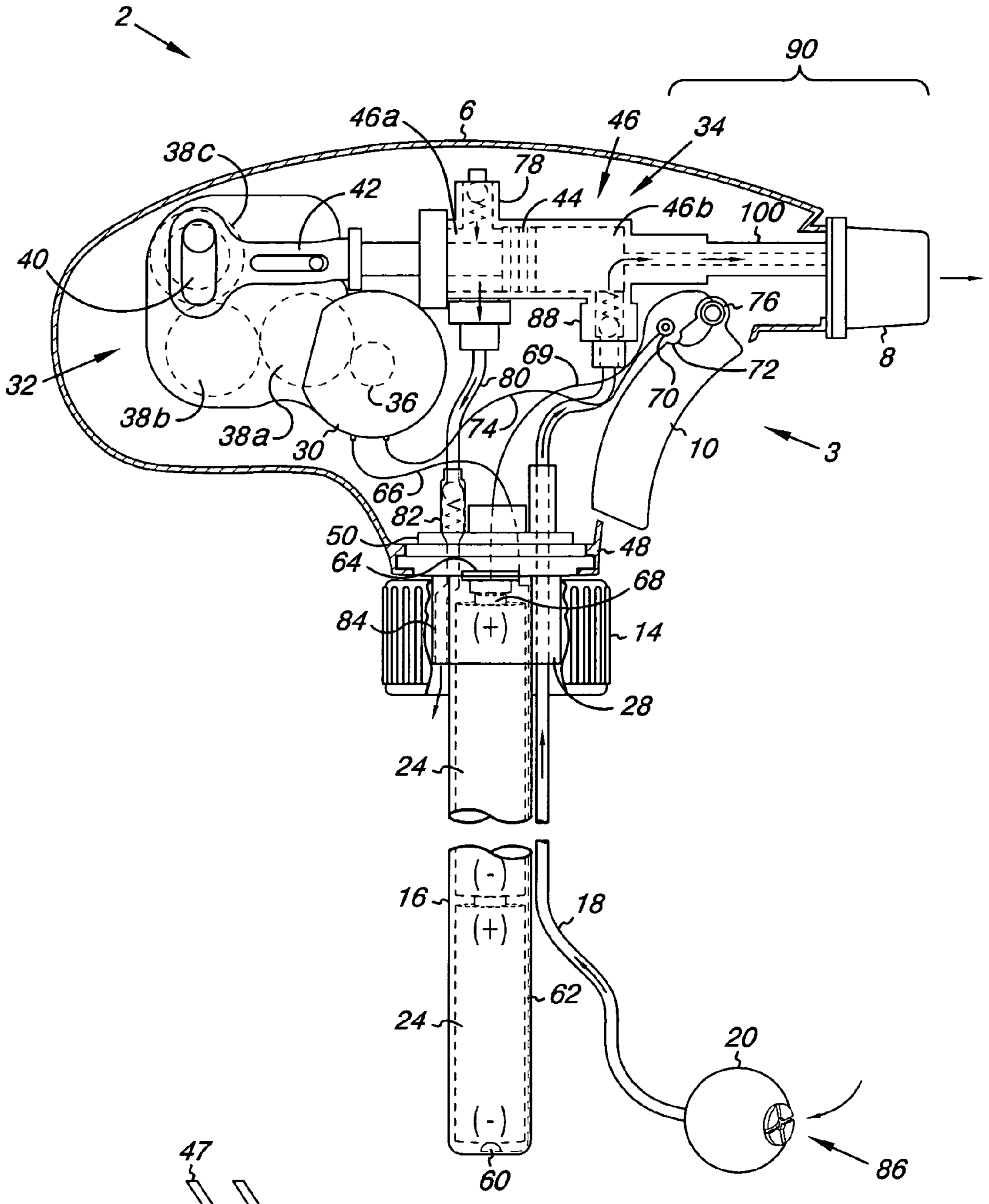
FIG. 4 is an elevation view of the safety lock side of the sprayer wherein the safety lock side of the housing is removed to reveal the pumping mechanism and the cap is partially cut away to reveal a coupling used to threadably attach the battery tube to the cap.
Figure 5:
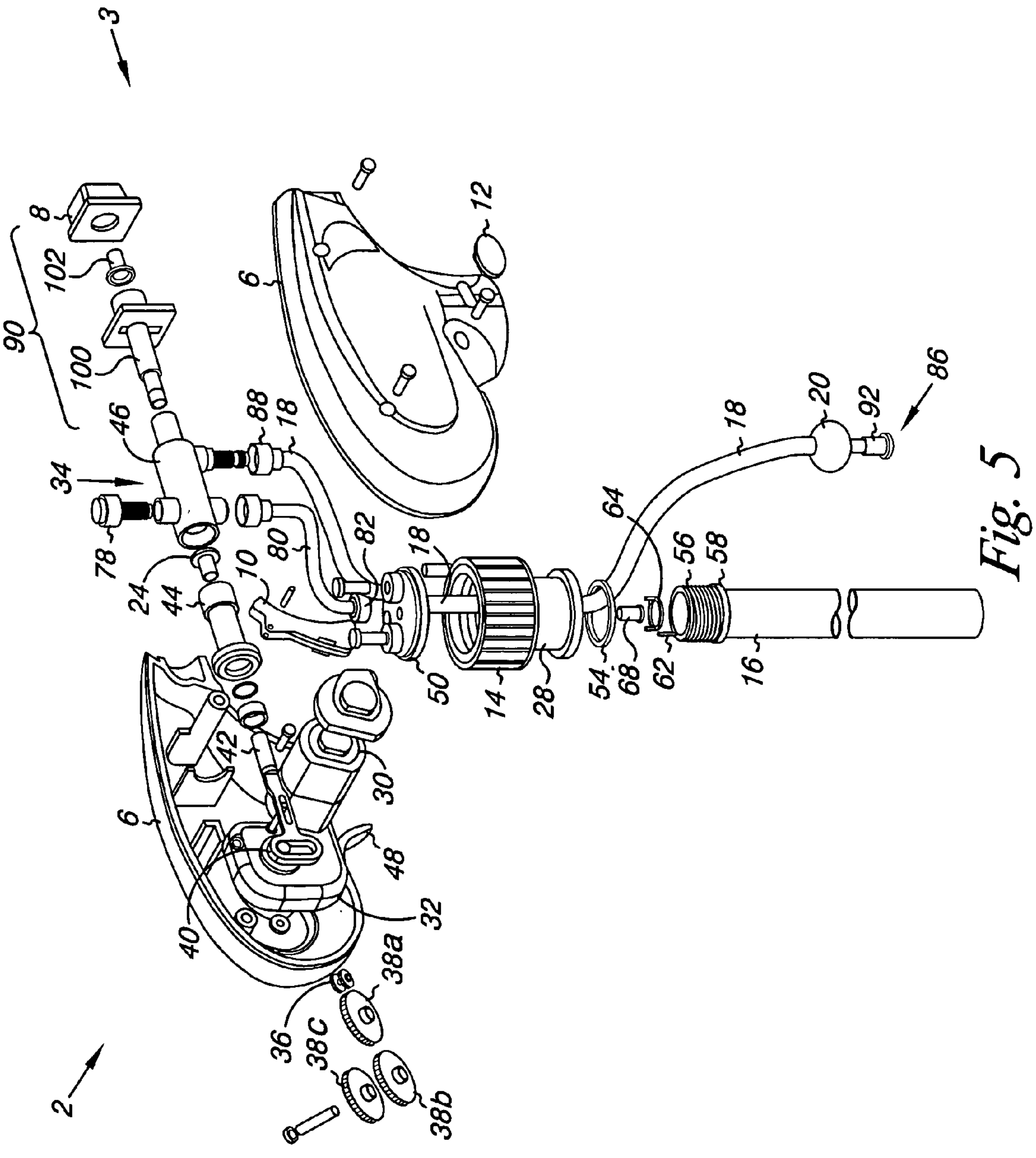
FIG. 5 is an exploded isometric view of the power sprayer.

For a detailed description of the pumping mechanism contained in the housing 6 and a description of the overall operation of the power sprayer 2, reference is now made to FIGS. 4 and 5. FIG. 4 is an elevation view of the safety lock side of the sprayer 2 wherein the safety lock side of the housing 6 is removed to reveal the pumping mechanism and the cap 14 is partially cut away to reveal a coupling 28 used to threadably attach the battery tube 16 to the cap 14. FIG. 5 is an exploded isometric view of the power sprayer 2.

Figure 4A:
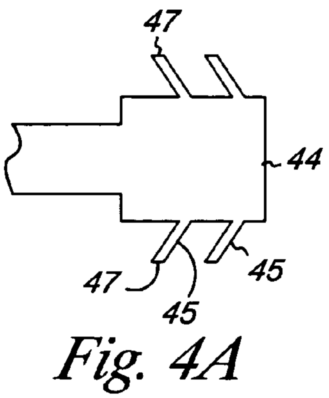
FIG. 4*a* depicts an embodiment of a piston of the pumping mechanism depicted in FIG. 4.

As indicated in FIGS. 4 and 5, the pumping mechanism is contained within the housing 6 and includes an electric motor 30, a transmission 32 and a pump 34. The motor 30 includes a drive gear 36, and the transmission 32 includes a series of three gears **38*a*, 38*b*, 38*c*, a cam 40, and a cam follower shaft 42. The pump 34 includes a piston 44 that is linearly displaceable within a cylinder 46 of the pump 34. FIG. 4*a* depicts in more detail that the piston has flanges 45, with tips 47, which help clear, purge or "sweep" the cylinder 46. The flanges facilitate the pumping of the contents, helping to seal the cylinder by acting as "O-rings," and maximizing the pump suction to draw in and push out the fluid or liquid being dispensed. The flanges also assist in the replacement of air pressure in and return of excess liquid or fluid to the container, thereby helping to prevent both leaking and a vacuum in the reservoir. Although two generally annular, circumferential flanges are depicted, it should understood that other embodiments, for example, using a different number of flanges or flanges of a different shape, may be used. Also, the flanges may be generally flexible, particularly the tips, and/or integrally formed with the piston, or they may be separate structures, e.g., rings, that are operably coupled to or carried by the piston. While FIGS. 4, 4*a* and 5 illustrate the employment of a piston-type pump 34, those skilled in the art will readily understand that a gear pump or other suitable pumping mechanism may be substituted for the piston pump 34** without departing from the spirit of the invention.

As indicated in FIGS. 4 and 5, the drive gear 36 powers gear **38*a*, which in turn powers gear 38*b*, which in turn powers gear 38*c*. Gear 38*c* causes the cam 40 to rotate, which causes the cam follower shaft 42 to reciprocally, linearly displace. The linear displacement of the cam follower shaft 42 causes the piston 44 to reciprocally, linearly displace within the cylinder 46 of the pump 34**.

As shown in FIGS. 4 and 5, the base of the housing 6 has a grooved neck 48 that receives a disc 50 therein. The disc 50 is secured to the top of coupling 28, which is pivotally mounted within the cap 14. As shown in FIG. 5, the cap 14 has a waterproof ring 54 for sealing the opening in the neck 22 of reservoir 4 when the cap 14 is threaded on tight.

As illustrated in FIG. 5, the top of the battery tube 16 has a plurality of male threads 56 for threadably engaging the female threads within the coupling 28. When battery tube 16 is threaded tightly into the coupling 28, a sealing ring 58 prevents any fluid 26 from entering the battery tube 16 from the reservoir 4.

As shown in FIG. 4, a negative conductor 60 makes electrical contact with the negative pole of the bottom battery 24. The negative conductor 60 is electrically connected to a first negative conductive pathway 62 that runs the length of the battery tube 16 to make electrical contact with a negative conductor ring 64 mounted in the bottom inside surface of the coupling 28. The negative conductor ring 64 makes electrical contact with a second negative conductive pathway 66 that runs to a first electrical lead on the motor 30.

As shown in FIG. 4, the coupling 28 has a positive conductor 68 for making electrical contact with the positive pole of the top battery 24 in the battery tube 16. The positive conductor 68 is electrically connected to a first positive conductive pathway 69 that is electrically connected to a conductive sleeve 70 near the trigger 10. A conductive saddle 72 is mounted on the trigger 10 and oriented and configured to mate with the conductive sleeve 70 when the trigger 10 is depressed by the user.

As indicated in FIG. 4, a second positive conductive pathway 74 is electrically connected to the conductive saddle 72 and runs to a second electrical lead on the motor 30. When the trigger 10 is depressed, the conductive saddle 72 and the conductive sleeve 70 are placed in electrical contact. This completes the electrical circuit between the energy supply (i.e., the batteries 24) and the motor 30 and causes the sprayer 2 to function. In one embodiment, a portion of the second positive conductive pathway 74 is formed around the pivot point 76 of the trigger 10 to serve as a spring to forwardly bias the trigger 10.

As shown in FIG. 4, when the piston 44 is displaced towards the nozzle cap 8, air is drawn in through a first air check valve 78 (which in one embodiment is a spring loaded ball type check valve) into the rearward section **46*a* of the cylinder 46. In one embodiment, the first air check valve 78 is located near the top of the cylinder 46. On its backstroke, as the piston 44 displaces away from the nozzle cap 8, the air is forced out of the rearward section 46*a* of the cylinder 46, into an air tube 80, through a second air check valve 82 (which in one embodiment is a spring loaded ball type check valve), through an air channel 84 running through the coupling 28, and into the reservoir 4 to prevent vacuum lock when the sprayer 2 is operating. In one embodiment, the second air check valve 82 is located near the bottom of the cylinder 46 approximately opposite the first air check valve 78. This linear or in-line arrangement allows any moisture accumulating in the rearward section 46*a* of the cylinder 46 to be purged, flushed, swept from and/or drained from the rearward section 46*a* into the reservoir 4. This purging is enhanced by the flanges 45**.

As indicated in FIG. 4, when the piston 44 is displaced away from the nozzle cap 8, the fluid 26 is drawn in into the intake opening 86 of the flexible intake tube 18, through the flexible intake tube 18 (which passes through the coupling 28), through a fluid check valve 88 (which in one embodiment is a spring loaded ball type check valve), and into the front section **46*b* of the cylinder 46. In one embodiment, the fluid check valve 88 is located near the bottom of the cylinder 46. As the piston 44 displaces towards the nozzle cap 8, the fluid 26 is forced out of the front section 46*b* of the cylinder 46 and through the nozzle assembly 90** to the atmosphere.

Figure 6:
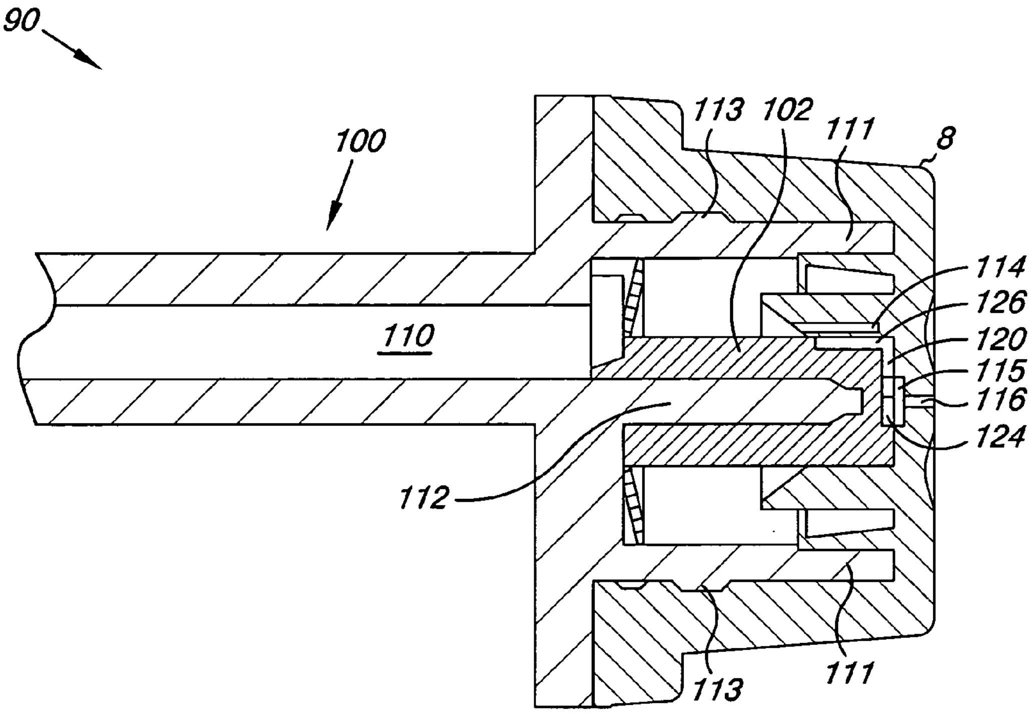
FIG. 6 is a vertical section taken through the nozzle assembly.

As shown in FIG. 5, the nozzle assembly 90 includes a nozzle tube 100, a nozzle valve 102 and the nozzle cap 8. As illustrated in FIG. 6, which is a vertical section taken through the nozzle assembly 90, the nozzle tube 100 has a nozzle channel 110, a pivot surface wall 111, and a pin 112 on which the nozzle valve 102 is mounted. The nozzle cap 8 is pivotally mounted about the pivot surface wall 111, and the pivot surface wall 111 has at least one retaining ridge 113 that mates with a corresponding groove in the nozzle cap 8 to retain the nozzle cap 8 in place.

Figure 7:
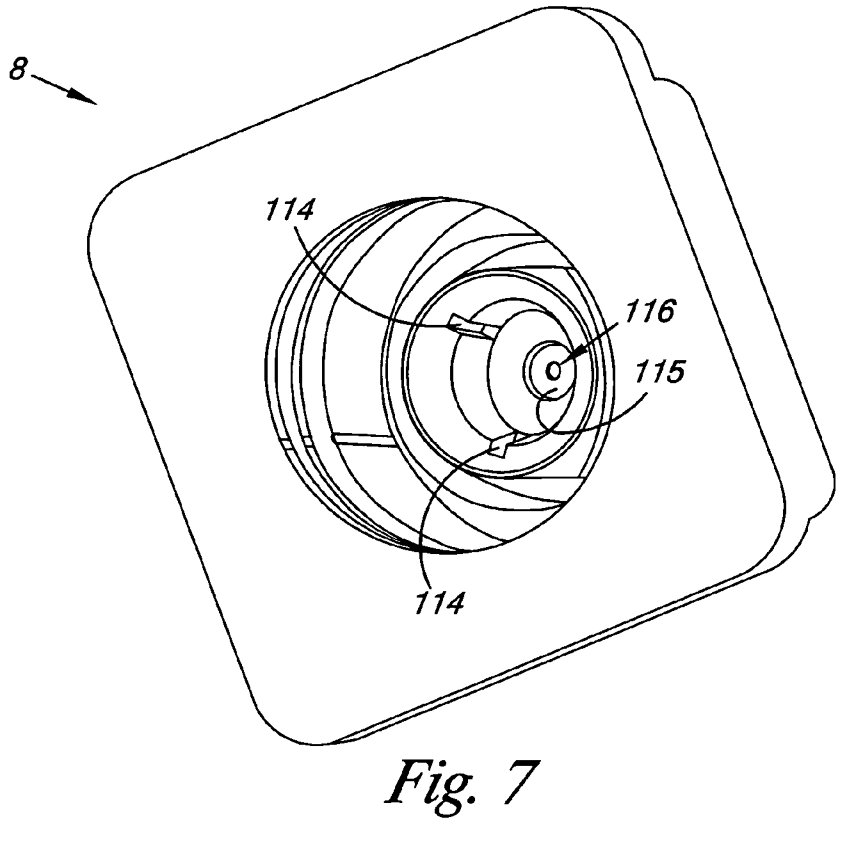
FIG. 7 is an isometric view of the interior of the nozzle cap.

As indicated in FIG. 6 and more clearly depicted in FIG. 7, which is an isometric view of the interior of the nozzle cap 8, the nozzle cap 8 has at least one cap channel 114 that is in fluid communication with the nozzle channel 110. The nozzle cap 8 also has a recessed area 115 surrounding a discharge orifice 116.

Figure 8:
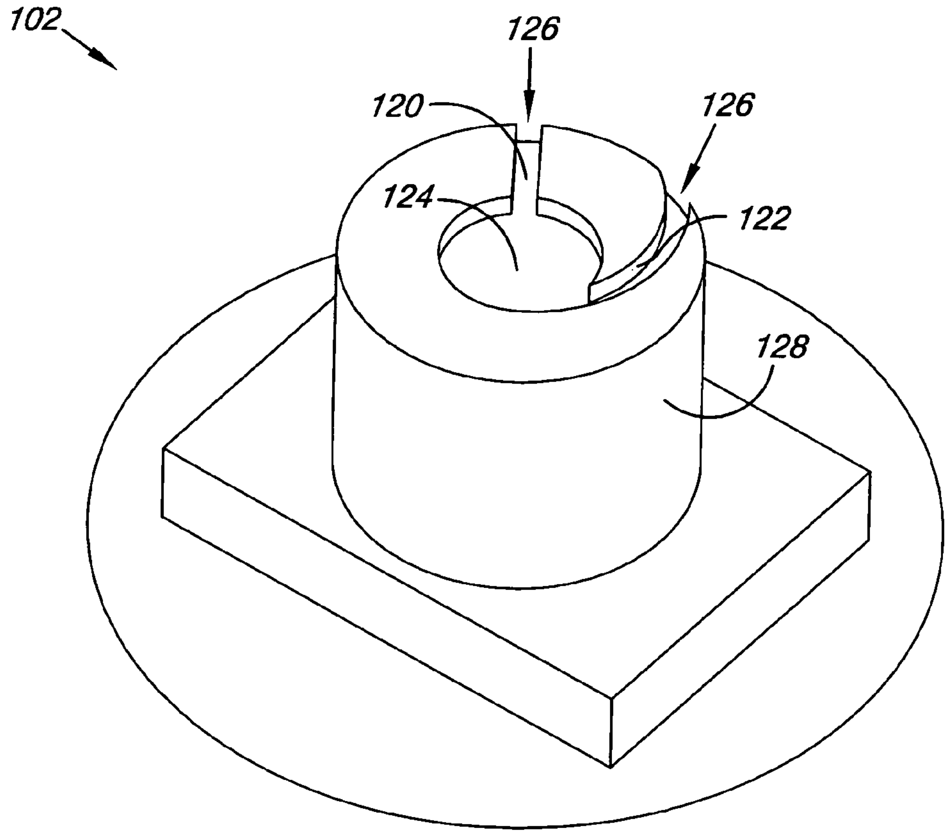
FIG. 8 is an isometric view of the discharge end of the nozzle valve.

As illustrated in FIG. 6 and more clearly depicted in FIG. 8, which is an isometric view of the discharge end of the nozzle valve 102, the nozzle valve 102 has a radial channel 120 and a tangential channel 122 that lead to a circular recessed center 124 at the center of the nozzle's end. The circular recessed center 124 and the recessed area 115 in the nozzle cap 8 combine to form a swirl chamber. The tangential channel 122 and the radial channel 120 each have a leader channel 126 that is recessed into the cylindrical side 128 of the nozzle valve 102.

As shown in FIG. 6, when the nozzle cap 8 is pivoted about the pivot surface wall 111 such that the word "STREAM" on the nozzle cap 8 is oriented upwards, the cap channel 114 is placed in fluid communication with the leader channel 126 that is associated with the radial channel 120. Thus, when the sprayer 2 is actuated, liquid travels through the nozzle channel 110, the cap channel 114, the leader channel 126, the radial channel 120, the swirl chamber 115, 124, and out the orifice 116 as a stream-type flow.

Similarly, when the nozzle cap 8 is pivoted about the pivot surface wall 111 such that the word "SPRAY" on the nozzle cap 8 is oriented upwards, the cap channel 114 is placed in fluid communication with the leader channel 126 that is associated with the tangential channel 122. Thus, when the sprayer 2 is actuated, liquid travels through the nozzle channel 110, the cap channel 114, the leader channel 126, the tangential channel 122, the swirl chamber 115, 124, and out the orifice 116 as a spray-type flow.

In some embodiments, when the nozzle cap 8 is pivoted about the pivot surface wall 111 to a selected position, the leader channels 126 are not placed in fluid communication with the cap channel 114. Consequently, liquid cannot flow through the nozzle assembly 90.

Figure 9:
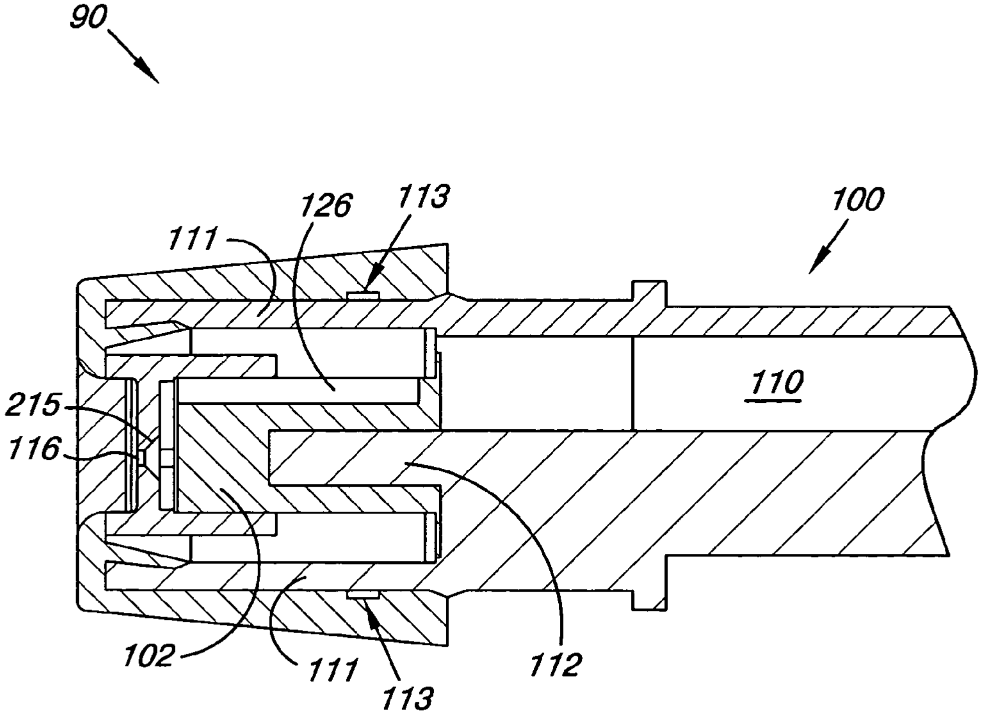
FIG. 9 is a vertical section taken through the nozzle assembly.
Figure 10:
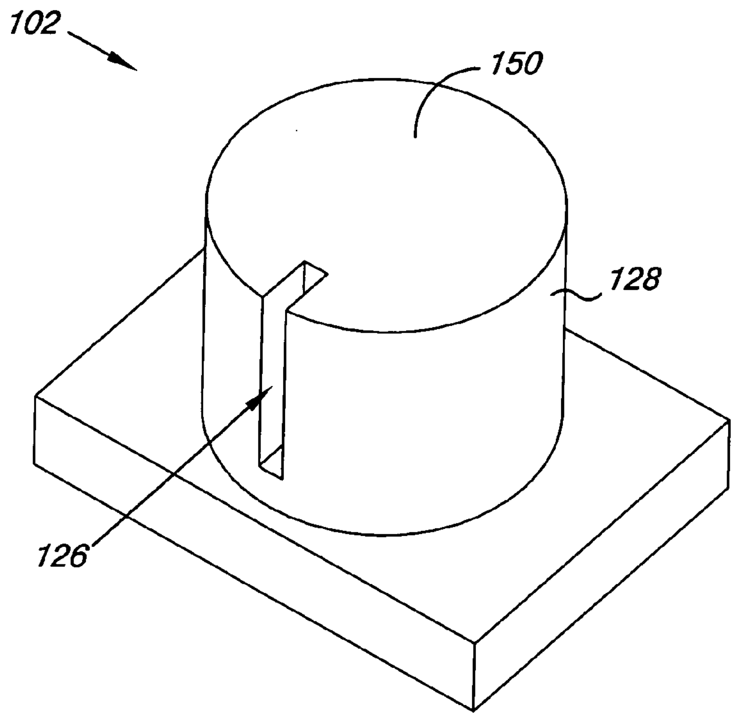
FIG. 10 is an isometric view of the discharge end of the nozzle valve.

An alternative configuration for the nozzle assembly 90 is shown in FIG. 9, which is a vertical section taken through the nozzle assembly 90. As indicated in FIG. 9 and more clearly depicted in FIG. 10, which is an isometric view of the discharge end of the nozzle valve 102, the nozzle valve 102 has a leader channel 126 that is recessed into the cylindrical side 128 of the nozzle valve 102. The leader channel 126 runs from near the base of the nozzle valve 126 to the end 150 of the nozzle valve 102, which is generally uniformly planar.

Figure 11:
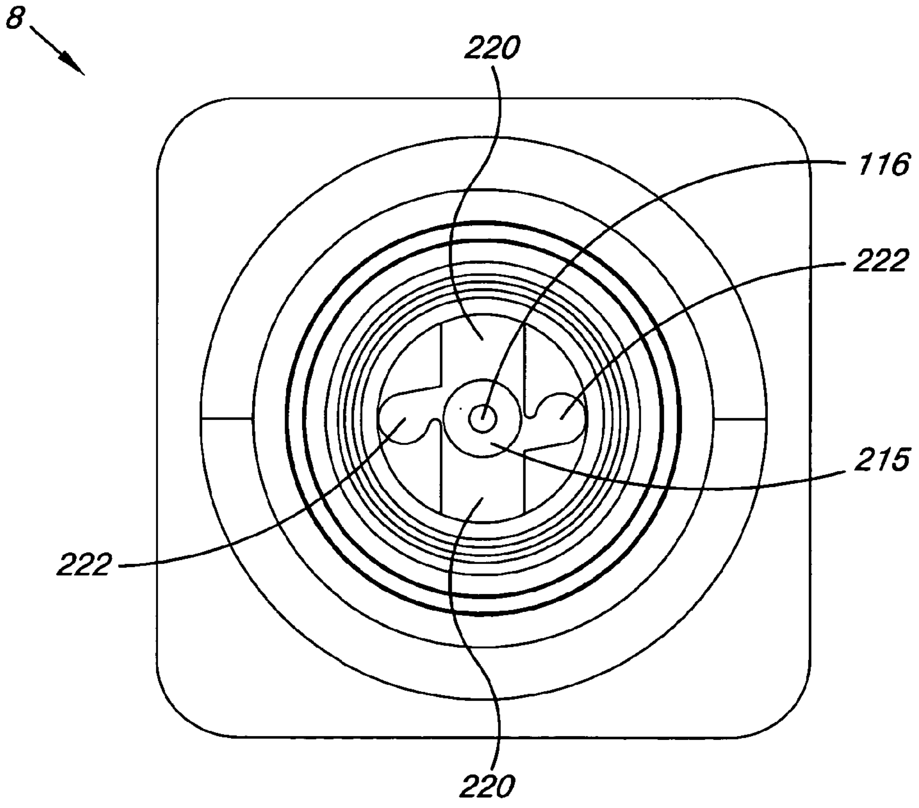
FIG. 11 is an elevation view of the interior of the nozzle cap.

As indicated in FIG. 9 and more clearly depicted in FIG. 11, which is an elevation view of the interior of the nozzle cap 8, the nozzle cap 8 has at least one radial channel 220 recessed into the interior surface of the nozzle cap 8. The nozzle cap 8 also has at least one tangential channel 222 recessed into the interior surface of the nozzle cap 8. Each radial and tangential channel 220, 222 extends to a central circular recessed area 215 in the interior surface of the nozzle cap 8. The circular recessed area 215 surrounds the discharge orifice 116. The circular recessed area 215 serves as a swirl chamber.

In one embodiment, as illustrated in FIG. 9, the circular recessed area 215 tapers towards the discharge orifice 116 and, as a result, has a Y-shaped cross-section. In another embodiment, the circular recessed area 215 does not taper towards the discharge orifice 116, but has a surface that is generally perpendicular to the axis of the discharge orifice 116. In other words, the circular recessed area 215 has a T-shaped cross-section as depicted in FIG. 6.

As shown in FIG. 9, when the nozzle cap 8 is pivoted about the pivot surface wall 111 such that the word "STREAM" on the nozzle cap 8 is oriented upwards, the radial channel 220 is placed in fluid communication with the leader channel 126. Thus, when the sprayer 2 is actuated, liquid travels through the nozzle channel 110, the leader channel 126, the radial channel 220, the swirl chamber 215, and out the orifice 116 as a stream-type flow.

Similarly, when the nozzle cap 8 is pivoted about the pivot surface wall 111 such that the word "SPRAY" on the nozzle cap 8 is oriented upwards, the tangential channel 222 is placed in fluid communication with the leader channel 126. Thus, when the sprayer 2 is actuated, liquid travels through the nozzle channel 10, the leader channel 126, the tangential channel 222, the swirl chamber 215, and out the orifice 116 as a spray-type flow.

Figure 12:
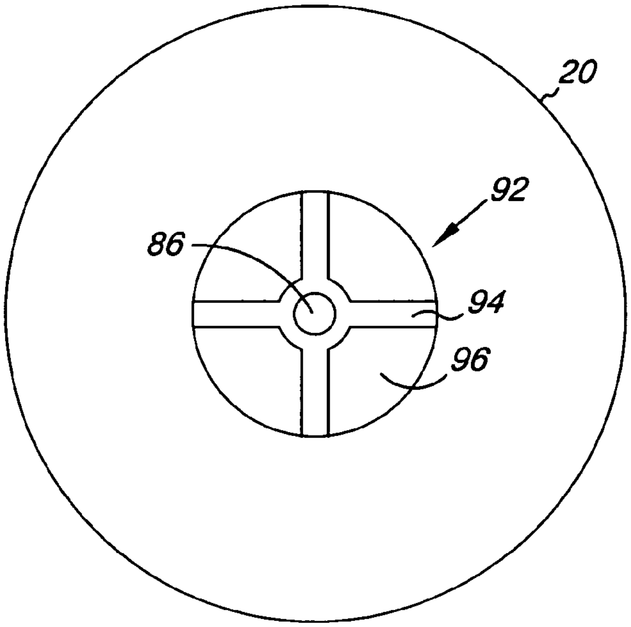
FIG. 12 is a front elevation view of the spherical weight that is mounted on the end of the flexible intake tube.
Figure 13:
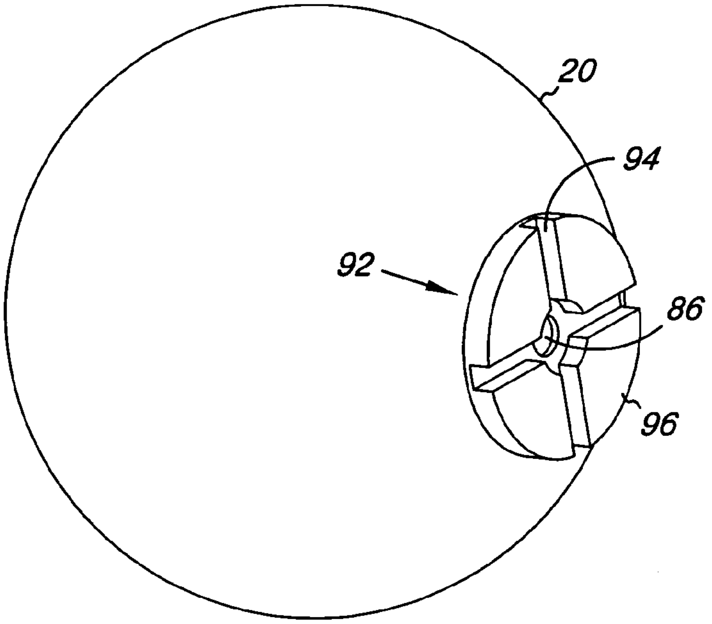
FIG. 13 is an isometric view of the spherical weight that is mounted on the end of the flexible intake tube.

As indicated in FIGS. 12 and 13, which are front elevation and isometric views, respectively, of the spherical weight 20 that is mounted on the end of the flexible intake tube 18, the intake opening 86 is recessed in the center of a disc 92 mounted on the spherical weight 20. The disc 92 has channels 94 that run from the outer circumference of the disc 92 to the intake opening 86, thereby forming protrusions 96 that extend beyond the intake opening 86. The protrusions 96 and channels 94 combine to prevent the intake opening 86 from being blocked by a surface of the reservoir 4 or the cap 14.

In one embodiment, the weight 20 is a very dense polymer sphere. In other embodiments, the weight 20 may be ceramic, glass, rubber, die cast metal, brass, etc. Regardless of the material selected, the material should be resistant to the corrosive effects of the liquid contained in the reservoir 4 and dense enough to sink in the liquid. The weight 20 is sized to be sufficiently heavy to draw the intake opening 86 of the flexible tube 18 to the bottom most portion of the fluid 26 contained in the reservoir 4, regardless of whether the reservoir 4 is oriented upright, sideways, upside down, etc.

In one embodiment, the flexible intake tube 18 is a very flexible silicone rubber. In other embodiments, the flexible intake tube 18 is another very flexible polymer. The length of the flexible intake tube 18 is sufficient to reach the bottom of the container, but not so excessive that it tangles with itself.

Although the present invention has been described with reference to preferred embodiments, persons skilled in the art will recognize that changes may be made in form and detail without departing from the spirit and scope of the invention.

We claim:

1. A dispenser adapted to couple to a fluid container having an opening surrounded by a neck, the dispenser comprising:

a cap adapted to seal the opening fluid tight when the dispenser is coupled to the container;

a dispensing head pivotably secured to the cap and including a fluid pump, a motor adapted to power the pump, a trigger adapted to actuate the motor, and a nozzle orifice in fluid communication with a discharge end of the pump;

an energy source electrically connected to the motor and extending inside the container;

a conduit having a first end in fluid communication with an intake end of the pump and a second end inside the container; and an enclosure adapted to contain at least a portion of the energy source and extending from the cap into the container.

2. The dispenser of claim 1, further comprising a coupling pivotally coupled to the cap and fixedly coupled to the dispensing head.

3. The dispenser of claim 2, wherein the enclosure is an elongated tube and the coupling threadably receives an end of the tube.

4. The dispenser of claim 3, wherein the energy source is selected from the group consisting of disposable batteries, rechargeable batteries and capacitors.

5. A dispenser adapted to couple to a fluid container having an opening surrounded by a neck, the dispenser comprising:

a cap adapted to seal the opening fluid tight when the dispenser is coupled to the container;

dispensing head pivotably secured to the cap and including a fluid pump, a motor adapted to power the pump, a trigger adapted to actuate the motor, and a nozzle orifice in fluid communication with a discharge end of the pump;

an energy source electrically connected to the motor and extending inside the container;

a conduit having a first end in fluid communication with an intake end of the pump and a second end inside the container; and an electrical circuit including an electrically conductive first surface and an electrically conductive second surface, wherein placing said surfaces in physical contact completes the electrical circuit and actuates the motor and wherein the first surface is a cylinder and the second surface is a saddle with an inner circumference matingly corresponding to an outer circumference of the cylinder.

6. The dispenser of claim 5, wherein the saddle is mounted on the trigger and depressing the trigger causes the saddle to matingly contact the cylinder.

7. A dispenser adapted to couple to a fluid container having an opening surrounded by a neck, the dispenser comprising:

a cap adapted to seal the opening fluid tight when the dispenser is coupled to the container;

a dispensing head pivotably secured to the cap and including a fluid pump, a motor adapted to power the pump, a trigger adapted to actuate the motor, and a nozzle orifice in fluid communication with a discharge end of the pump;

an energy source electrically connected to the motor and extending inside the container;

a conduit having a first end in fluid communication with an intake end of the pump and a second end inside the container; and an electrical circuit including an electrically conductive first surface and an electrically conductive second surface, wherein placing said surfaces in physical contact completes the electrical circuit and actuates the motor, wherein the electrical circuit further includes electrical wiring and wherein a portion of the wiring forwardly biases the trigger.

8. A dispenser adapted to couple to a fluid container having an opening surrounded by a neck, the dispenser comprising:

a cap adapted to seal the opening fluid tight when the dispenser is coupled to the container;

a dispensing head pivotably secured to the cap and including a fluid pump, a motor adapted to power the pump, a trigger adapted to actuate the motor, and a nozzle orifice in fluid communication with a discharge end of the pump;

an energy source electrically connected to the motor and extending inside the container;

a conduit having a first end in fluid communication with an intake end of the pump and a second end inside the container; and an electrical circuit including an electrically conductive first surface and an electrically conductive second surface, wherein placing said surfaces in physical contact completes the electrical circuit and actuates the motor, wherein the energy source is a battery and the device further comprises an elongated tube including a first end and a second end, wherein the first end threadably attaches to a coupling that is pivotally attached to the cap and fixedly attached to the dispensing head, wherein the tube extends from the coupling into the container and houses the battery, and wherein the electrical circuit further comprises:

a conductor ring received within the coupling;

a first battery contact received within the coupling and adapted to contact an upper most pole of a battery;

a second battery contact received within the second end and adapted to contact a lower most pole of a battery; and a first conductor running from the second battery contact to the first end and adapted to contact the conductor ring when the first end is threadably attached to the housing.

9. A dispenser adapted to couple to a fluid container having an opening surrounded by a neck, the dispenser comprising:

a cap adapted to seal the opening fluid tight when the dispenser is coupled to the container;

a dispensing head pivotably secured to the cap and including a fluid pump, a motor adapted to power the pump, a trigger adapted to actuate the motor, and a nozzle orifice in fluid communication with a discharge end of the pump;

an energy source electrically connected to the motor and extending inside the container; and a conduit having a first end in fluid communication with an intake end of the pump and a second end inside the container, wherein the conduit is highly flexible and a weight is attached to the second end of the conduit, wherein the weight is ceramic, has a density greater than a fluid to be contained in the container, is large enough to cause the second end of the conduit to be maintained at the lowest portions of the fluid regardless of the orientation of the container and has an orifice at which the second end of the conduit terminates and through which fluid enters the conduit, wherein the orifice opens into a channel separating protrusions.

10. A dispenser adapted to couple to a fluid container having an opening surrounded by a neck, the dispenser comprising:

a cap adapted to seal the opening fluid tight when the dispenser is coupled to the container;

a dispensing head pivotably secured to the cap and including a fluid pump, a motor adapted to power the pump, a trigger adapted to actuate the motor, and a nozzle orifice in fluid communication with a discharge end of the pump;

an energy source electrically connected to the motor and extending inside the container; and a conduit having a first end in fluid communication with an intake end of the pump and a second end inside the container, wherein the pump is a piston pump including a piston, a rod and a cylinder, wherein the rod linearly reciprocally displaces the piston in the cylinder and the cylinder includes a forward section in fluid communication with the nozzle orifice, a rearward section separated from the forward cylinder section by the piston and in which the rod is located, an air intake valve in fluid communication with the rearward section, and a fluid intake valve in fluid communication with the forward cylinder section.

11. The dispenser of claim 10, further comprising an air tube having a first end in fluid communication with the rearward section and a second end in fluid communication with the container.

12. The dispenser of claim 11, wherein the air intake valve fluidly communicates with an uppermost portion of the rearward section and the air tube fluidly communicates with the lowermost portion of the rearward section.

13. The dispenser of claim 10, wherein the first end of the conduit is in fluid communication with the fluid intake valve.

14. The dispenser of claim 10, further comprising a transmission including a series of gears that transfer power from the motor to a cam, which causes a cam follower shaft to linearly reciprocally drive the rod.

15. A dispensing attachment for coupling to a container containing a substance to be dispensed, said attachment comprising:

a motor;

an actuating mechanism adapted to actuate the motor, wherein the actuating mechanism comprises a trigger and a safe operably coupled to the trigger, whereby the trigger is selectively enabled or disabled by the safety switch;

a pump driven by the motor and including an intake end and a discharge end;

a housing enclosing the motor and pump;

a nozzle in fluid communication with the discharge end of the pump; and a generally flexible pick-up tube with a first end and a second end, wherein the first end is in fluid is in fluid communication with the intake end of the pump and the second end is free and carries a weight formed of a corrosion and rust resistant material, the weight including surface texturing comprising a plurality of relieved areas, wherein the weight is adjacent to an intake opening associated with the free end of the pick-up tube, and wherein the relieved areas have a portion immediately adjacent to the intake opening.

16. The dispensing attachment according to claim 15, wherein the safety switch comprises a slide button extending through a slot in the housing to couple to a block, wherein the slide button is exterior to the housing, the block is interior to the housing, and when the safety switch is slid into a safe position, the block impedes the displacement of the trigger.

17. A dispensing attachment for coupling to a container containing a substance to be dispensed, said attachment comprising:

a motor;

an actuating mechanism adapted to actuate the motor;

a pump driven by the motor and including an intake end and a discharge end;

a housing enclosing the motor and pump;

a nozzle in fluid communication with the discharge end of the pump;

a generally flexible pick-up tube with a first end and a second end, wherein the first end is in fluid is in fluid communication with the intake end of the pump and the second end is free and carries a weight formed of a corrosion and rust resistant material; and a battery tube extending from the housing into the container.

18. A sprayer for dispensing a fluid, the sprayer comprising:

a fluid container; and a motor operated pump including:

a pump cylinder;

a fluid pathway operably connecting the container, the pump and a discharge opening; and a venting arrangement including a first vent and a second vent associated with the pump cylinder, said first vent adapted to allow air into the cylinder and said second vent in fluid communication with the container, generally opposite to the first vent, and adapted to allow air and excess fluid into the container, wherein said discharge opening is in a nozzle comprising a valve and a cap, said cap having an inside wall with a generally central discharge opening connected to the fluid pathway, said inside wall having a generally central recess generally coaxial with said opening.

19. A sprayer for dispensing a fluid, the sprayer comprising:

a fluid container; and a motor operated pump including:

a pump cylinder;

a fluid pathway operably connecting the container, the pump and a discharge opening;

a venting arrangement including a first vent and a second vent associated with the pump cylinder, said first vent adapted to allow air into the cylinder and said second vent in fluid communication with the container, generally opposite to the first vent, and adapted to allow air and excess fluid into the container; and a housing enclosing the motor operated pump and a battery tube extending from the housing into the container.

20. A dispenser adapted to couple to a fluid container having an opening surrounded by a neck, the dispenser comprising:

a cap adapted to seal the opening fluid tight when the dispenser is coupled to the container;

a dispensing head pivotably secured to the cap and including a piston pump comprising a piston for reciprocation in a cylinder, said cylinder comprising a forward section in fluid communication with a nozzle orifice, a rearward section separated from the forward cylinder section by the piston, an air intake valve in fluid communication with the rearward section, and a fluid intake valve in fluid communication with the forward cylinder section, a motor adapted to power the pump, a trigger adapted to actuate the motor, and a nozzle orifice in fluid communication with a discharge end of the pump;

an energy source electrically connected to the motor and, said energy source generally adjacent to the cap; and a conduit having a first end in fluid communication with an intake end of the pump and a second end inside the container; and an air tube having a first end in fluid communication with the rearward section and a second end in fluid communication with the container.

21. The dispenser of claim 20, wherein the air intake valve fluidly communicates with an uppermost portion of the rearward section and the air tube fluidly communicates with the lowermost portion of the rearward section.

22. The dispenser of claim 21, wherein the air intake valve and the air tube are generally opposed.

23. The dispenser of claim 21, wherein the air intake valve and the air tube are linearly aligned.

24. The dispenser of claim 23, wherein the piston comprises an annulus contacting the cylinder.

25. The dispenser of claim 24, wherein the annulus comprises at least one flange extending circumferentially around the piston.

* * * * *

UNITED STATES PATENT AND TRADEMARK OFFICE

CERTIFICATE OF CORRECTION

PATENT NO. : 7,097,119 B2
APPLICATION NO. : 10/832682
DATED : August 29, 2006
INVENTOR(S) : James Russell Hornsby It is certified that error appears in the above-identified patent and that said Letters Patent is hereby corrected as shown below:

| **Col.** | **Line** | **Should Read** |
|---|---|---|
| 11 | 22 | -- channel 110 -- |

| **Col.** | **Line** | **Should Read** |
|---|---|---|
| 12 | 24 | -- a dispensing head -- |
| 14 | 42 | -- a safety switch operably -- |

Signed and Sealed this

Second Day of January, 2007

JON W. DUDAS

*Director of the United States Patent and Trademark Office*